Feb. 2, 1960 H. S. RAINBOW 2,923,125
DUSTING STRUCTURE FOR BY-PASS TURBO-JET ENGINES
Filed Dec. 10, 1954 3 Sheets-Sheet 1

United States Patent Office 2,923,125
Patented Feb. 2, 1960

---

2,923,125

DUCTING STRUCTURE FOR BY-PASS TURBO-JET ENGINES

Horace Sinclair Rainbow, Coventry, England, assignor to Armstrong Siddeley Motors Limited, Coventry, England Application December 10, 1954, Serial No. 474,348

Claims priority, application Great Britain December 30, 1953

5 Claims. (Cl. 60—35.6)

This invention relates to a turbo-jet engine of the kind in which part of the air compressed by the engine is passed along an annular by-pass duct, surrounding a portion of the engine, to increase the thrust of the engine, whilst another part is subjected to further compression in the engine.

The main object of the present invention is to provide an improved construction of annular ducting, and an improved arrangement of mounting the ducting, which is to carry the said one part of the compressed air.

According to the invention, use is made, where the annular by-pass duct begins, of a structural support comprising inner and outer rings interconnected by a number of aerofoil-section spokes, and of an intermediate aerofoil-section ring which initiates the aforesaid division of the compressed air.

One construction according to the invention is hereinafter particularly described with reference to the accompanying drawings, in which.

Figure 1:
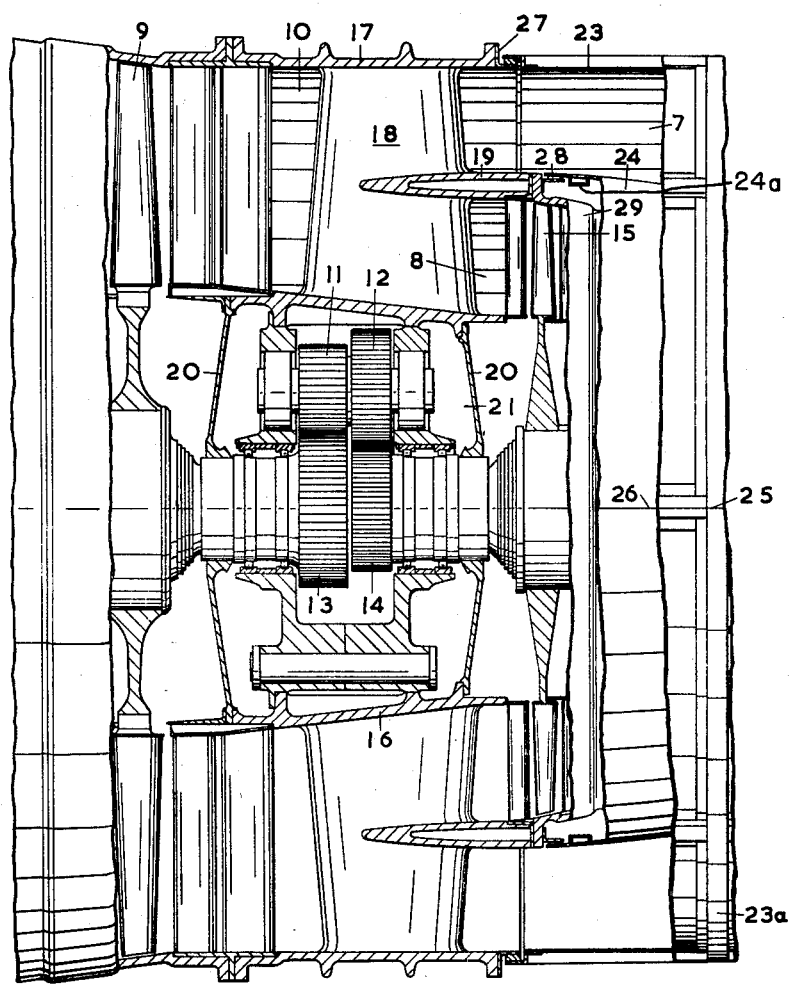
Figure 1 is an elevation, largely in section, of a portion of the upstream end of a compound ducted-fan gas turbine engine embodying the invention.

In Figure 1 is shown part of the fan 9 in a duct 10, at the upstream end of the engine, the fan 9 being driven from reduction gearing 11, 12, 13, 14 at the adjacent end of the low-pressure compressor 15. A structural support includes an inner ring 16 forming the inner wall of that portion of the duct 10, at the output end of the fan 9, leading to the compressor 15, and also supporting the reduction gearing 11, 12, 13, 14. The structural support is constituted by a one-piece casting including the inner ring 16, an outer ring 17, interconnecting aerofoil-section spokes 18, and an aerofoil-section ring 19. The casting can, for example, be of magnesium-zirconium alloy; two end covers 20 being used to form with the inner ring 16 an inner chamber 21 in which the reduction gearing 11, 12, 13, 14 is mounted.

The aerofoil-section ring 19 initiates the division of compressed air into two streams, one of which flows through a by-pass duct 7 and the other through a "compressor" duct 8.

Figure 2:
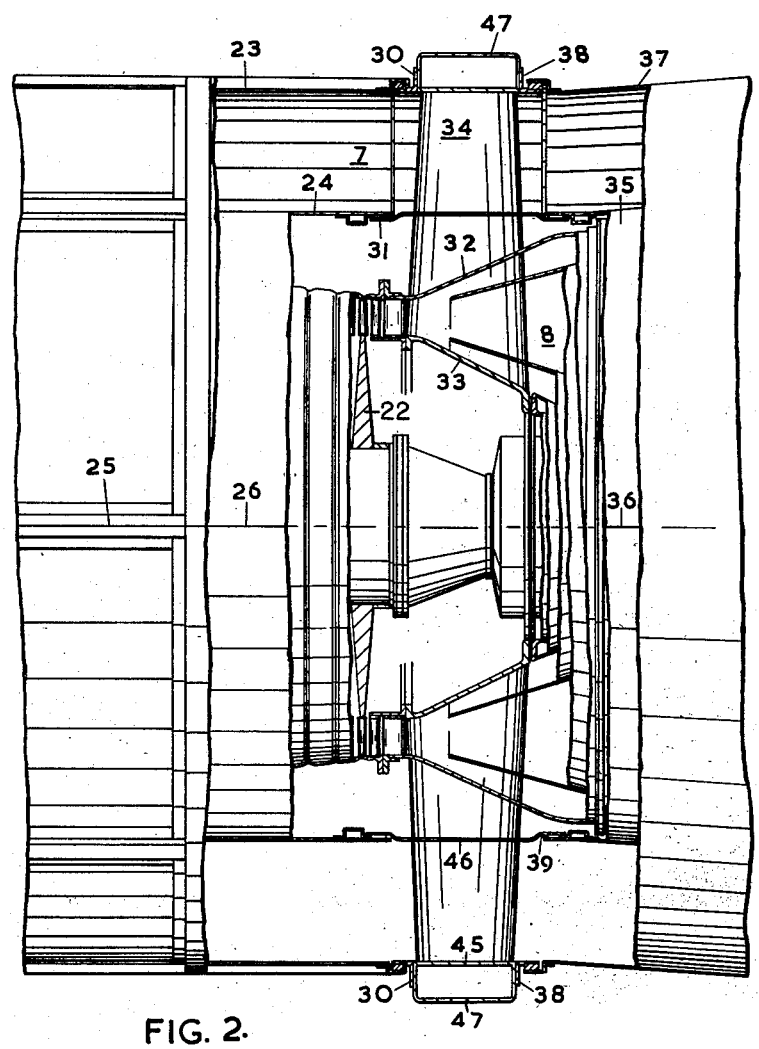
Figure 2 is an elevation, partly in section, of an intermediate portion of the same engine including the upstream end of the combustion system.

The annular by-pass ducting downstream of the structural support comprises a forward section enclosing both the low-pressure compressor 15 and high-pressure compressor 22 (Figure 2), this section comprising two shells 23, 24 of light alloy, each shell being divided, longitudinally into two portions at 25 and 26 respectively, to allow assembly. Both shells 23 and 24 are reinforced by channel-section rings 23a and 24a respectively. The shells 23, 24 are supported at their upstream ends by annular mounting rings 27, 28 respectively, on the said structural support. The mounting ring 28 for the upstream end of the inner shell 24 is carried by the intermediate aerofoil-section ring 19 which also supports the adjacent end of the compressor stator casing 29. The downstream ends of shells 23 and 24 are supported by annular mounting rings 30, 31 carried by a downstream structural support comprising inner and outer engine casings 32, 33—between the high-pressure compressor and the combustion system 8—interconnected by integral aerofoil-section spokes 34 which are continued radially outwardly to form part of and support non-removable portions 45 and 46 of the ductings which are integral with a box-section reinforcing ring 47.

The rear section of the ducting downstream of the downstream structural support comprises an inner shell 35 which is outside the combustion system, both the turbine stages, and the exhaust cone assembly, and which is divided at 36 into two longitudinal portions to allow of assembly, and an outer shell 37 which is formed integrally in light alloy.

Figure 3:
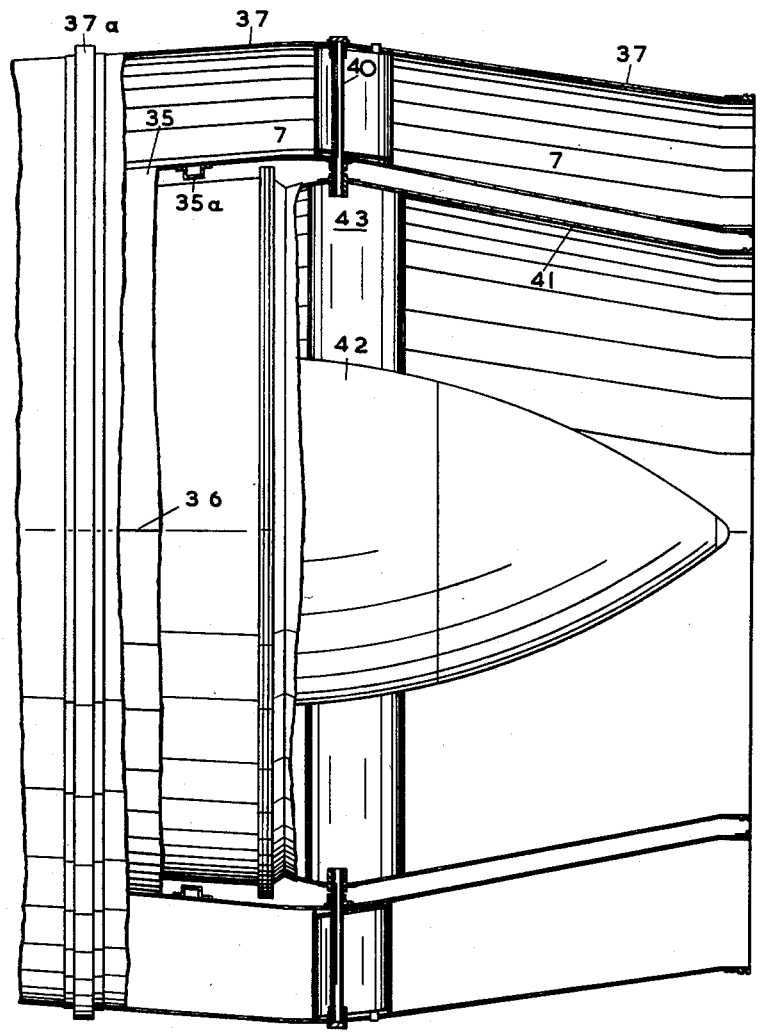
Figure 3 is an elevation, with parts cut away and partly in section, of the downstream end portion of the same engine.

Both the inner and outer shells 35, 37 of the rear section of the ducting are reinforced by channels 35a and 37a respectively (Figure 3) and are supported by annular mounting rings 38, 39 at their upstream ends from the downstream structural support. The mounting rings 30 and 38 are fixed to the box-section reinforcing ring 47. Towards their downstream ends the shells 35 and 37 are supported by means of radial pins 40 engaged in the outer casing 41 of the exhaust cone assembly at the downstream end of the low-pressure turbine stage. The exhaust cone assembly comprises an inner casing 42, and the outer casing 41 interconnected by aerofoil-section spokes 43 into which the radial pins 40 extend.

What I claim as my invention and desire to secure by Letters Patent of the United States is:

1. A turbo-jet engine of the compound type having a a low pressure compressor and a high pressure compressor, including inner and outer walls forming an annular by-pass duct surrounding a portion of the engine, and a structural support at the beginning of the duct, the structural support comprising inner and outer rings interconnected by a number of aerofoil spokes, the structural support also comprising an aerofoil-section ring which is intermediate said inner and outer rings, the aerofoil-section ring connected to said spokes and supporting the beginning of the inner wall of the by-pass duct, the annular by-pass duct downstream of the structural support comprising a forward section enclosing both the low pressure and the high pressure compressors, a compressor stator casing and a second structural support downstream of that first-mentioned, and annular mounting rings on both said structural supports, said forward section of said annular by-pass duct being supported on the annular mounting rings, one annular mounting ring on the first-mentioned structural support being fast with the aerofoil-section ring, which latter also supports the beginning of the compressor stator casing.

2. A turbo-jet engine of the compound type having a low pressure compressor and a high pressure compressor, including inner and outer walls forming an annular by-pass duct surrounding a portion of the engine, and a structural support at the beginning of the duct, the structural support comprising inner and outer rings interconnected by a number of aerofoil spokes, the structural support also comprising an aerofoil-section ring which is intermediate said inner and outer rings, the aerofoil-section ring connected to said spokes and supporting the beginning of the inner wall of the by-pass duct, the annular by-pass duct downstream of the structural support comprising a forward section enclosing both the low pressure and the high pressure compressors, the forward section comprising two shells which are divided longitudinally, a compressor stator casing and a second structural support downstream of that first-mentioned, and annular mounting rings on both said structural supports, said shells being supported on the annular mounting rings, one annular mounting ring on the first-mentioned structural support being fast with the aerofoil-section ring, which latter also supports the beginning of the compressor stator casing.

3. A turbo-jet engine of the compound type comprising a low pressure compressor, a high pressure compressor, inner and outer walls forming an annular by-pass duct surrounding a portion of the engine and a structural support at the beginning of the duct, the structural support comprising inner and outer rings interconnected by a number of aerofoil spokes, and the structural support also comprising an aerofoil-section ring which is intermediate said inner and outer rings, the aerofoil-section ring supporting the beginning of the inner wall of the by-pass duct, the annular by-pass duct downstream of the structural support comprising a forward section enclosing both the low pressure and the high pressure compressors, the forward section comprising two shells divided longitudinally, the engine also comprising a compressor stator casing, a second structural support downstream of the first structural support and annular mounting rings both on the structural support and on the downstream structural support, the shells being supported on the annular mounting rings, the downstream structural support including inner and outer engine casings interconnected by radial spokes extended radially outwardly to carry non-removable portions of the ducting reinforced by a box-section ring which carries the appropriate mounting rings.

4. A turbo-jet engine of the compound type having two turbine stages, a combustion system, an exhaust cone assembly, a low pressure compressor, a high pressure compressor, inner and outer walls forming a by-pass duct surrounding a portion of the engine, and a structural support at the beginning of the duct, the structural support comprising inner and outer rings interconnected by a number of aerofoil spokes, and the structural support also comprising an aerofoil-section ring which is intermediate said inner and outer rings, the aerofoil-section ring supporting the beginning of the inner wall of the by-pass duct, and the annular by-pass duct downstream of the structural support comprising a forward section enclosing both the low pressure and the high pressure compressors, the forward section comprising two shells divided longitudinally, the engine also including a compressor stator casing and a second structural support downstream of the first-mentioned structural support, and annular mounting rings on both structural supports, the shells being supported on the annular mounting rings, a rear section of the duct downstream of the downstream structural support comprising an inner shell outside the combustion system, the turbine stages and the exhaust cone assembly, the inner shell also being formed of two longitudinal portions to allow of its assembly, the rear section also comprising an outer shell which is formed of one piece.

5. A turbo-jet engine, of the compound type, comprising a low pressure compressor, a high pressure compressor, inner and outer walls forming an annular by-pass duct surrounding a portion of the engine, and a structural support at the beginning of the duct, the structural support comprising inner and outer rings interconnected by a number of aerofoil spokes, and the structural support also comprising an aerofoil-section ring which is intermediate said inner and outer rings, the intermediate aerofoil-section ring supporting the beginning of the inner wall of the by-pass duct, the annular by-pass duct downstream of the structural support comprising a forward section enclosing both the low pressure and the high pressure compressors, the forward section comprising two shells divided longitudinally, the engine also comprising a compressor stator casing and a second structural support downstream of the first-mentioned structural support, and annular mounting rings on both structural supports, the shells being supported on the annular mounting rings, the second structural support including inner and outer engine casings interconnected by radial spokes which are extended radially outwardly to carry non-removable portions of the ducting reinforced by a box-section ring which carries the appropriate mounting rings, and the two shells each being reinforced by channel-section rings.

References Cited in the file of this patent

UNITED STATES PATENTS

| | | |
|---|---|---|
| 2,592,938 | McNaught | Apr. 15, 1952 |
| 2,641,902 | Kerr | June 16, 1953 |
| 2,703,477 | Anxionnaz | Mar. 8, 1955 |
| 2,711,631 | Willgoos | June 28, 1955 |

FOREIGN PATENTS

| | | |
|---|---|---|
| 126,578 | Australia | Aug. 7, 1947 |
| 767,704 | Germany | May 26, 1953 |